US012252390B2

(12) United States Patent
Dresser et al.

(10) Patent No.: US 12,252,390 B2
(45) Date of Patent: Mar. 18, 2025

(54) BEVERAGE DISPENSING MACHINE WITH CUP DISPENSER

(71) Applicant: Marmon Foodservice Technologies, Inc., Osseo, MN (US)

(72) Inventors: Zachary Dresser, Batavia, IL (US); David Njaastad, Palatine, IL (US); Michael Graef, Aurora, IL (US); Daniel Muskin-Pierret, Oak Park, IL (US); Brian Mathews, Sycamore, IL (US); Kevin Michael Carrara, Des Plaines, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 142 days.

(21) Appl. No.: 18/053,620

(22) Filed: Nov. 8, 2022

(65) Prior Publication Data

US 2023/0141811 A1 May 11, 2023

Related U.S. Application Data

(60) Provisional application No. 63/277,359, filed on Nov. 9, 2021.

(51) Int. Cl.
*B67D 1/08* (2006.01)
*G07F 13/06* (2006.01)
*G07F 13/10* (2006.01)

(52) U.S. Cl.
CPC ......... *B67D 1/0894* (2013.01); *B67D 1/0892* (2013.01); *G07F 13/065* (2013.01); (Continued)

(58) Field of Classification Search
CPC ................ B67D 1/0892; B67D 1/0894; B67D 2210/00076; B67D 2210/00078; G07F 13/065; G07F 13/10
See application file for complete search history.

(56) References Cited

U.S. PATENT DOCUMENTS 1,666,008 A * 4/1928 Graffenberger ...... B65G 59/105 221/221
2,227,196 A * 12/1940 Nicholson ............... G07F 13/10 312/139.2

(Continued)

FOREIGN PATENT DOCUMENTS

CN 109035583 A 12/2018
CN 109243074 A 1/2019

(Continued)

OTHER PUBLICATIONS

Extended European Search Report for European Application No. 22206474.3, dated Jul. 5, 2023.

(Continued)

*Primary Examiner* — Nicolas A Arnett
(74) *Attorney, Agent, or Firm* — Andrus Intellectual Property Law, LLP

(57) ABSTRACT

A cup dispensing system in an automated dispensing beverage dispensing system receives a first supply of cups at a first dispensing assembly with a first selective release device and receives a second supply of cups at a second dispensing assembly with a second selective release device. The first and second dispensing assemblies respectively coincide with first and second indexed locations on a cup conveyance system. The cup dispensing system operates to dispense a first cup from the first dispensing assembly to the first indexed location and a second cup from the second dispensing assembly to the second indexed location.

20 Claims, 13 Drawing Sheets

(52) U.S. Cl.
CPC .... *G07F 13/10* (2013.01); *B67D 2210/00076* (2013.01); *B67D 2210/00078* (2013.01)

(56) References Cited

U.S. PATENT DOCUMENTS

| | | | | | |
|---|---|---|---|---|---|
| 3,000,408 | A * | 9/1961 | Vischer, Jr. | G07F 13/10 | 221/222 |
| 3,279,652 | A * | 10/1966 | Willvonseder | B65G 59/102 | 221/223 |
| 3,460,593 | A * | 8/1969 | Kuckens | A47F 1/106 | 141/174 |
| 4,195,751 | A * | 4/1980 | Smith | G07F 13/06 | 221/96 |
| 4,418,837 | A * | 12/1983 | Kontz | B65G 59/108 | 221/222 |
| 4,426,017 | A * | 1/1984 | Ficken | B65G 59/102 | 221/241 |
| 4,989,753 | A * | 2/1991 | Brogna | G07F 13/10 | 221/121 |
| 4,991,741 | A * | 2/1991 | Anderson | B65G 59/106 | 414/797.9 |
| 5,058,630 | A * | 10/1991 | Wiley | G07F 13/10 | 141/94 |
| 5,261,467 | A * | 11/1993 | Yamamoto | G07F 13/10 | 141/97 |
| 5,518,149 | A * | 5/1996 | Lotspeich | G07F 13/10 | 221/241 |
| 6,059,359 | A * | 5/2000 | Cassani | B62J 1/00 | 297/219.11 |
| 6,102,246 | A * | 8/2000 | Goulet | B65G 59/106 | 221/121 |
| 7,100,796 | B1 * | 9/2006 | Orr | G07F 9/10 | 141/369 |
| 7,308,916 | B2 * | 12/2007 | Akuzawa | G07F 13/10 | 221/221 |
| 7,669,732 | B2 * | 3/2010 | Njaastad | A47F 1/085 | 221/256 |
| 7,731,058 | B2 * | 6/2010 | Stamatis Filho | A47F 1/10 | 194/257 |
| 8,225,960 | B2 * | 7/2012 | Njaastad | F25C 5/187 | 222/642 |
| 8,757,222 | B2 * | 6/2014 | Rudick | G07F 9/009 | 141/94 |
| 8,972,048 | B2 * | 3/2015 | Canora | G07F 9/001 | 700/240 |
| 9,045,323 | B2 * | 6/2015 | Crane | B67D 1/0894 | |
| 9,067,775 | B2 * | 6/2015 | Mattos, Jr. | B67D 1/0888 | |
| 9,204,734 | B2 * | 12/2015 | Jablonski | A47F 1/085 | |
| 9,250,256 | B2 * | 2/2016 | Lukhaub | B65G 59/105 | |
| 9,290,371 | B2 * | 3/2016 | Crane | B67D 1/0888 | |
| 9,327,958 | B2 * | 5/2016 | Angus | B67D 1/0041 | |
| 9,384,621 | B1 * | 7/2016 | Chang | G07F 11/44 | |
| 9,656,849 | B2 * | 5/2017 | Hawken | B67D 1/0085 | |
| 9,788,682 | B2 * | 10/2017 | Brandsma | A47J 31/3628 | |
| 9,840,407 | B2 * | 12/2017 | DiFatta | G06F 3/017 | |
| 9,886,185 | B2 * | 2/2018 | Abrach | G06F 3/04842 | |
| 9,944,472 | B2 * | 4/2018 | Crane | B66F 19/00 | |
| 10,031,505 | B2 * | 7/2018 | Martindale | G05B 19/042 | |
| 10,059,581 | B2 * | 8/2018 | Peters | G07F 13/065 | |
| 10,140,602 | B2 * | 11/2018 | Kelly | G07F 9/001 | |
| 10,155,651 | B2 * | 12/2018 | Keating | B67D 3/0077 | |
| 10,239,742 | B2 * | 3/2019 | Dresser | B67D 1/1236 | |
| 10,354,477 | B2 * | 7/2019 | Magno | G07F 13/10 | |
| 10,373,276 | B2 * | 8/2019 | Carpenter | G07F 13/065 | |
| 10,515,327 | B2 * | 12/2019 | Davis | G06Q 10/0633 | |
| 10,689,240 | B1 * | 6/2020 | Schultz | B67D 1/0064 | |
| 10,689,241 | B2 * | 6/2020 | Dresser | B67D 1/0881 | |
| 11,053,109 | B2 * | 7/2021 | Knight | B67D 1/1202 | |
| 11,158,151 | B2 * | 10/2021 | DiFatta | G07F 9/001 | |
| 2002/0014495 | A1 * | 2/2002 | Sato | G07F 13/10 | 221/191 |
| 2008/0164274 | A1 * | 7/2008 | Stettes | A47J 31/401 | 340/686.1 |
| 2016/0376140 | A1 * | 12/2016 | Tansey, Jr. | A47J 31/44 | 700/236 |
| 2019/0057570 | A1 * | 2/2019 | Ditrani | G07F 11/54 | |
| 2019/0174933 | A1 * | 6/2019 | Auda | H04N 1/00206 | |
| 2019/0259077 | A1 * | 8/2019 | Cuppari | G06Q 20/18 | |
| 2019/0300357 | A1 * | 10/2019 | Crawford | G07F 13/065 | |
| 2019/0352161 | A1 * | 11/2019 | Knight | G06K 19/0723 | |
| 2020/0270115 | A1 * | 8/2020 | Schultz | B67D 1/0888 | |
| 2021/0086529 | A1 * | 3/2021 | Auda | G07F 17/42 | |
| 2021/0087045 | A1 * | 3/2021 | Carignan | B65B 61/025 | |
| 2022/0106181 | A1 * | 4/2022 | Miller | G07F 13/10 | |

FOREIGN PATENT DOCUMENTS

| | | | | |
|---|---|---|---|---|
| EP | 0424580 | | 5/1991 | |
| EP | 1575006 | A1 | 9/2005 | |
| EP | 3586236 | B1 | 9/2020 | |
| GB | 786882 | A | 11/1957 | |
| GB | 788511 | | 1/1958 | |
| GB | 1546312 | | 5/1979 | |
| GB | 2072634 | A * | 10/1981 | B65G 59/105 |
| GB | 2247007 | A | 2/1992 | |
| GB | 2291867 | A * | 2/1996 | B65G 59/108 |
| WO | 2014115073 | A1 | 7/2014 | |
| WO | 2017192871 | A1 | 11/2017 | |
| WO | 2018089460 | A1 | 5/2018 | |
| WO | 2018140546 | A1 | 8/2018 | |
| WO | 2020162657 | A1 | 8/2020 | |
| WO | 2021094977 | A1 | 5/2021 | |

OTHER PUBLICATIONS

Series 671 Plastic Cup Dispenser Brochure dated Dec. 6, 2017.
Series 672 Plastic Cup Dispenser Brochure dated Nov. 28, 2017.
Series 674 Plastic Cup Dispenser Brochure dated Nov. 28, 2017.
European Search Report for European Application No. 22206474.3, dated Mar. 28, 2023.

* cited by examiner

BEVERAGE DISPENSING MACHINE WITH CUP DISPENSER

CROSS-REFERENCE TO RELATED APPLICATIONS

The application claims priority of US Provisional Patent Application No. 63/277,359, filed on Nov. 9, 2021, the contents of which is herein incorporated by reference in its entirety.

BACKGROUND

The present disclosure relates to beverage dispensing systems. More particularly, the present disclosure relates to automated beverage dispensing systems for automatically selecting and placing a cup, dispensing a beverage into the cup, and staging filled cups for delivery to a customer.

Automated beverage dispensing systems are known in the fields of fast and quick service restaurants. Automated beverage dispensing systems automate, or partially automate the act of filling cups with beverages to fulfill customer orders.

Examples of automated beverage dispensing systems are disclosed in the following patent references, which are hereby each incorporated by reference herein in their entireties:

U.S. Pat. Nos. 3,279,652; 4,418,837; 4,426,017; and 5,518,149 all disclose examples of cup dispensing devices.

U.S. Pat. Nos. 9,045,323; 9,290,371; 9,944,472; 10,239,742; and 10,689,241 all disclose linear configurations for transport of cups for loading, filling, and/or staging by a beverage machine.

U.S. Pat. Nos. 6,053,359; 6,102,246; and 10,689,240 disclose carousel-style configurations for transport of cups for loading, filling, and/or staging by a beverage machine.

U.S. Pat. Nos. 7,669,732; 8,225,960; 9,204,734; 9,656,849; 10,515,327; U.S. Patent Application Publication No. 2020/0273283; and U.S. Patent Application No. 17/493,257 all disclose other features which may be incorporated into examples of beverage dispensing machine as disclosed in further detail herein.

BRIEF DISCLOSURE

In an example of an automated beverage dispensing machine having a front and a back and a first side opposite a second side, a conveyance system defines a plurality of cup locations and operates to sequentially move the plurality of cup locations through a plurality of indexed locations. A cup dispensing machine is configured to receive a supply of cups. The cup dispensing machine is operable to dispense a cup to a cup loading location that coincides with an indexed location of the plurality of indexed locations. A beverage dispensing machine is configured to dispense a beverage at a beverage dispense location of the plurality of indexed locations. A computer associates an ordered beverage to a cup location of the plurality of cup locations. The computer maintains a record of a status of the cup location and the position of the cup location relative to the plurality of indexed locations.

An example of an automated beverage dispensing machine includes a front and a back and a first side opposite a second side. A conveyance system defines a plurality of cup locations each with a respective cup holder. The conveyance system operates to sequentially move the plurality of cup locations through a circuit comprising a plurality of indexed locations. A cup dispensing machine receives a first supply of cups at a first dispensing assembly. The first dispensing assembly includes a first selective release device. The first dispensing assembly coincides with a first indexed location of the plurality of indexed locations. The cup dispensing machine is configured to receive a second supply of cups at a second dispensing assembly. The second dispensing assembly includes a second selective release device. The second dispensing assembly coincides with a second indexed location of the plurality of indexed locations. The cup dispensing machine is operable to dispense a cup from the first supply of cups to a first cup location of the plurality of cup locations on the conveyance system at the first indexed location. The cup dispensing machine is operable to dispense a cup from the second supply of cups to a second cup location of the plurality of cup locations on the conveyance system at the second indexed location.

In additional examples of the automated beverage dispensing machine, the first dispensing assembly includes a first plurality of selective release devices including the first selective release device. The second dispensing assembly includes a second plurality of selective release devices including the second selective release device. Each of the selective release devices may include a cam body, a cam extending about the cam body, the cam having a cam edge. The cam may further include a leading cam surface and a trailing cam surface. A gear may extend about the cam body. A cup support flap may be connected to the cam body and extend radially away from an axis of the cam body. A beverage dispensing machine may be configured to dispense a beverage at a beverage dispense location of the plurality of indexed locations. A computer may associate an ordered beverage to a cup location of the plurality of cup locations and maintains a record of a status of the cup location and the position of the cup location relative to the plurality of indexed locations.

Each dispensing assembly may include a motor and a drive gear and a belt that operatively extends between the drive gear and the gear about the cam body of each of the selective release devices of a respective dispensing assembly. Movement of the belt by the drive gear simultaneously moves each of the cam assemblies by interaction with the respective gears of the cam assemblies. The cup support flap is constructed of an elastomeric material. The cup support flap is configured to deform to receive a supply of cups pushed therethrough to load the dispensing assembly with the first or second supply of cups. The cup dispensing machine is configured to upwardly tilt relative to the rest of the automated beverage dispensing machine to a loading configuration wherein the dispensing assemblies are accessible to receive the supply of cups through the dispensing assemblies past the selective release devices. A support chimney extends from each of the selective release devices. The support chimney is configured to receive a stack of cups there of the first supply of cups or the second supply of cups. Each dispensing assembly is positioned at a different height above the respective first and second indexed locations. Each dispensing assembly includes a dispensing chimney extending from the dispensing assembly in a direction of the first and second indexed locations, respectively, wherein the dispensing chimneys end at a same height above the respective first and second indexed locations.

An example of a selective release device for dispensing a cup includes a cam body. A cam extends about the cam body and radially away from the cam body. The cam includes a cam edge and a leading cam surface and a trailing cam surface. A resiliently deformable cup support flap radially extends from the cam body.

In further examples of the selective release device, a gear extends about the cam body. The selective release device includes a drive gear and a belt that engages the drive gear and the gear about the cam body. The drive gear moves the belt which in turn moves the cam body. The leading cam surface is located on a first side of the cam body in an axial direction and the trailing cam surface is located on a second side of the cam body in an axial direction. A lower cam surface is opposite the leading cam surface. The leading cam surface angles upwards in the axial direction above the lower cam surface from the cam edge. The trailing cam surface angles downwards in the axial direction from the lower cam surface. The lower cam surface is horizontal. The cam body defines a pocket and the cup support flap is seated within the pocket. The cup support flap and the cam body include axially aligned through holes. A lower cam surface opposite is opposite the leading cam surface in an axial direction, the leading cam surface angles upwards in the axial direction above the lower cam surface from the cam edge, and the cup support flap includes a flap projection that extends radially outward from the cam body. The flap projection includes an upper surface positioned below the lower cam surface in the axial direction. The flap projection includes an outer edge in the shape of an arc. An outer edge of the cup support flap is complementary with an outer edge of the cam to form an outer circumference of the cam assembly.

DETAILED DISCLOSURE

Examples of automated beverage dispensing machines are provided herein. These disclosed automated beverage dispensing machines include features or combinations of features directed to cup dispensing in an automated beverage dispensing.

Automated beverage dispensing machine cup dispensers present numerous challenges. Because an automated beverage dispensing machine requires supplies of multiple sizes of cups. Mechanisms within the cup dispenser select a requested cup and operate to dispense the cup. In part due to these mechanisms, the supplies of cups are held without visual feedback of the remaining cup supply. Additionally, the size and complexity of the cup dispenser presents a challenge to loading a new supply of cups, particularly for workers of lower height or upper body strength. The automated beverage dispensing machines and cup dispensers as disclosed herein provide solutions to these challenges.

In examples, a cup dispenser of the beverage dispensing machine provides enhanced user visual confirmation of the remaining supply of cups stored in the beverage dispensing machine. Positioning of these stored cups at the exterior of the beverage dispensing machine combined with transparent elements provides visual confirmation of cup supply. Location of the cup storage across the front of the beverage dispensing machine further places this visual confirmation in convenient location for user observation and monitoring. In examples, sensors may be arranged relative to the cup storage for each cup type/size and the supply monitored whereby an indication of low supply, for example illumination of a light or graphical user interface icon, may be made to indicate a low supply of cups, in addition to any enhanced visual confirmation of supply as noted above.

In examples, the cup dispenser includes features which promote the loading of cups into the dispenser, including tilting of the cup dispenser to facilitate loading and a selective release device which facilitates loading of an unturned stack of cups upwards through the selective release device.

In further examples, the cup dispenser is arranged to dispense cups of different sizes to different locations within the automated beverage dispenser. The automated beverage dispenser may include a carousel that defines a plurality of indexed locations and the cup dispenser dispenses cups of different sizes into different indexed locations. The automated beverage dispenser may further operate to maintain a record of cups dispensed into particular locations on the carousel.

Figure 1:
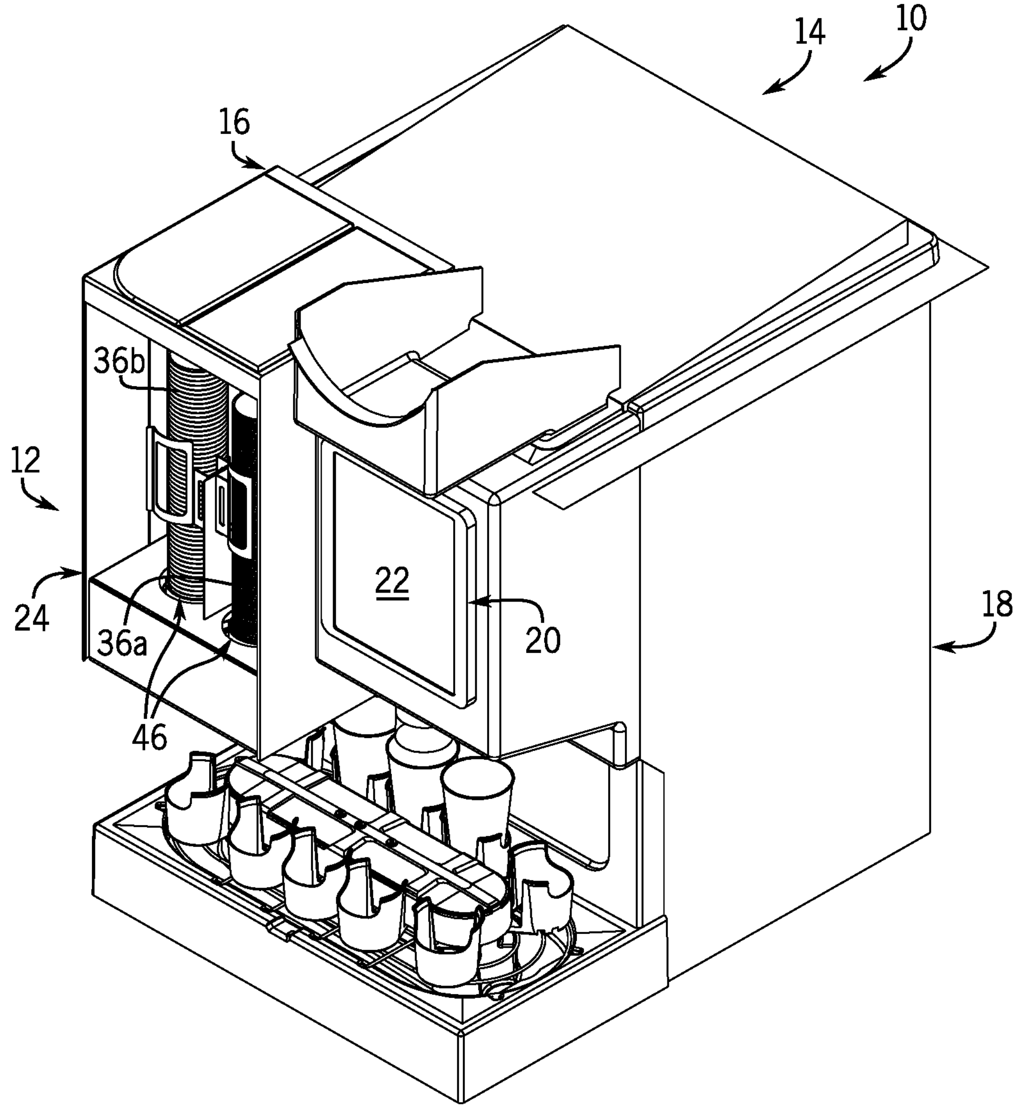
FIG. 1 is a perspective view of an example of a beverage dispensing machine.

FIG. 1 is a perspective view of an example of a beverage dispensing machine 10 which is configured as a “crew serve” dispensing machine to automatedly or semi-automatedly dispense beverages consistent with a customer’s order. The beverage dispensing machine 10 is configured to provide automated cup selection, placement, ice dispensing, beverage dispensing, and staging of customer-ordered beverages in a fast or quick service restaurant setting. Automation of crew-served beverage fulfillment process as provided with the features of the disclosure herein can improve the speed of service and order completion accuracy.

The beverage dispensing machine 10 is defined by a front 12, a back 14, and sides 16, 18. To facilitate operation in a restaurant configuration, the beverage dispensing machine 10 is both, observable, and configurable from the front. That is, the user interface 22, which may include a graphical display 20, the cup dispenser 24, and the cup carousel 26 are positioned at the front 12 of the beverage dispensing machine 10. As will be described in further detail herein, portions of the cup carousel 26 and the cup dispenser 24 are set forward of the user interface 22. The cup dispenser 24 further is further observable and/or accessible from the front of the beverage dispensing machine 10 to facilitate observation of present levels of the cup supplies and loading thereof.

Figure 2:
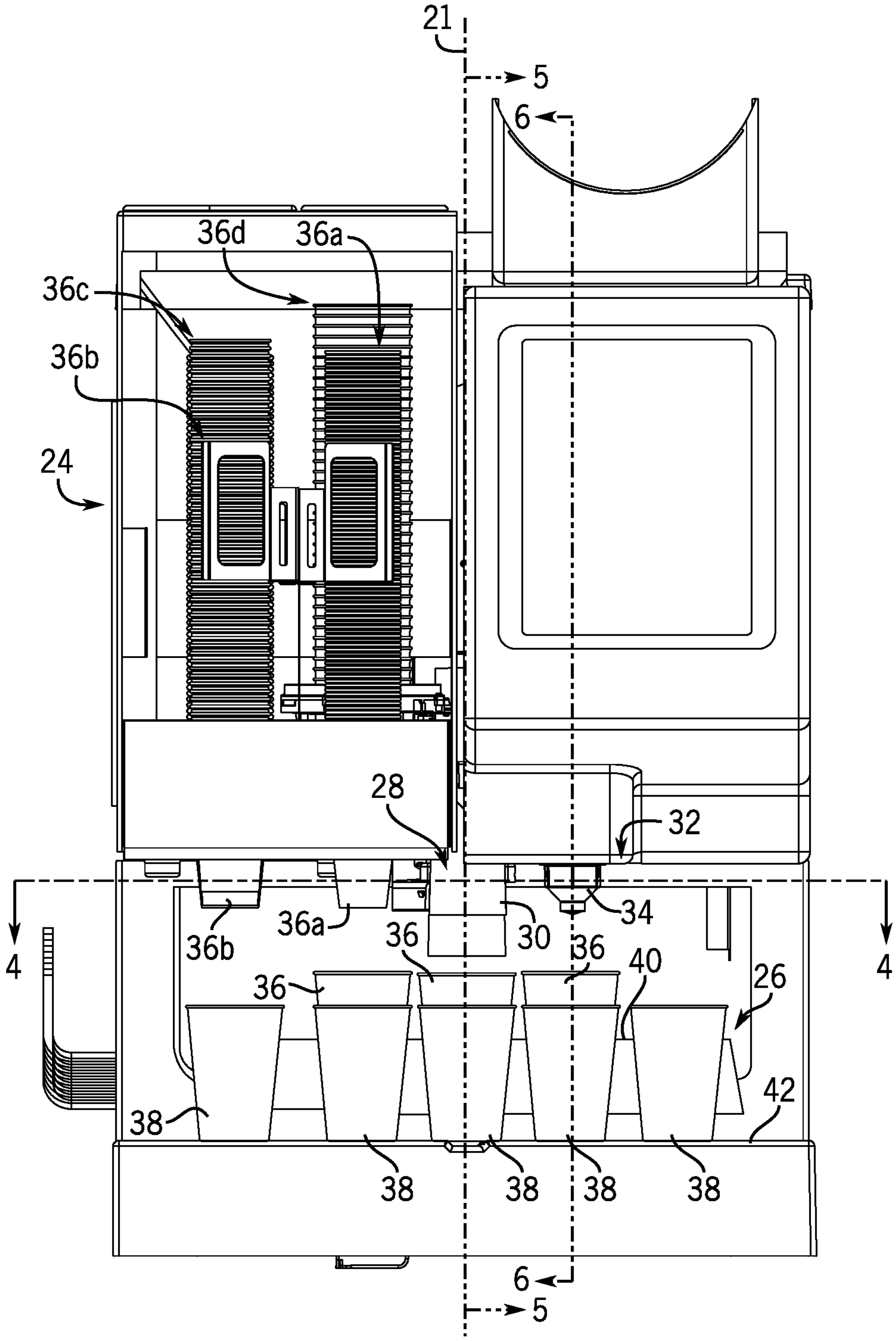
FIG. 2 is a front view of the beverage dispensing machine.

FIG. 2 is a front view of the beverage dispensing machine 10. The beverage dispensing machine 10 includes an ice dispenser 28 of which an ice dispensing chute 30 is shown. The ice dispenser 28 exemplarily includes an ice bin associated with a cold plate, and may further include an auger or agitator which is operated to dispense a portion of the ice from the ice bin out through the ice dispensing chute 30 as described herein. The beverage dispensing machine 10 includes a beverage dispenser 32, a nozzle 34 of which is shown. The beverage dispenser includes a plurality of fluid control valves which are operated to control the flow of pre-mixed beverages or beverage constituents. Fluid control valves may be operated to selectively dispense concentrated flavoring and a diluent fluid (e.g. still or carbonated water) from the nozzle 34 according to a drink order from a customer.

Figure 3:
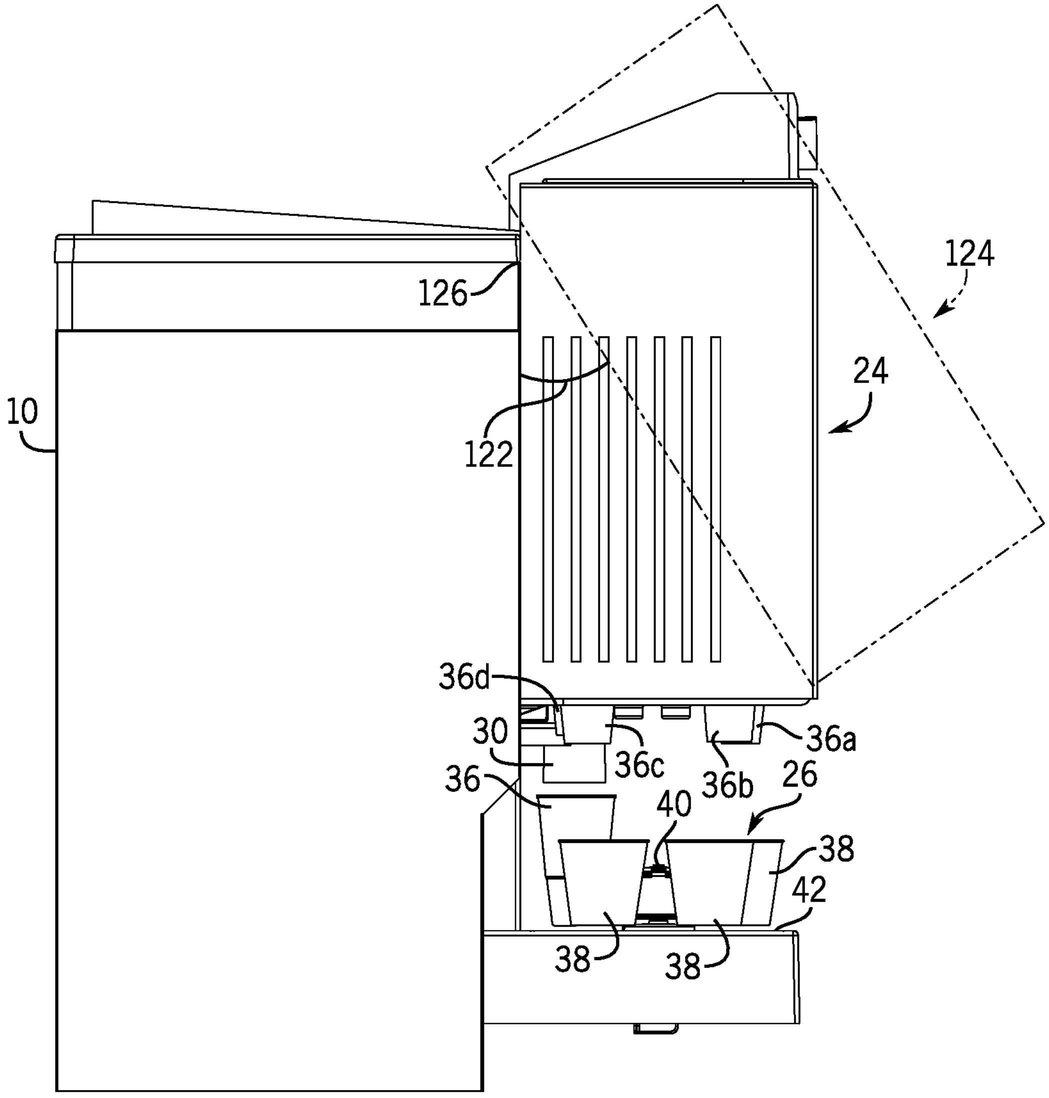
FIG. 3 is a side view of the beverage dispensing machine.

The cup dispenser 24 is configured to hold at least one if not more stacks of cups 36 in which the beverages are to be dispensed. In the example shown, the cup dispenser 24 includes four stacks 36*a*-36*d* of cups. Each of the stacks 36*a*-36*d* of cups may exemplarily be a different size, configured to hold a different volume of beverage. The stacks 36*a*-36*d* of cups may be arranged with one or more stacks positioned behind, or towards the back 14 of the beverage dispensing machine 10 from other stacks. Alternatively, the stacks 36*a*-36*d* may be arranged with one or more stacks positioned towards the front 12 of the beverage dispensing machine or towards the side 16, 18 of the beverage dispensing machine. That is, each of the stacks 36*a*-36*d* occupies a separate fixed location relative to the rest of the beverage dispensing machine. In the example depicted in FIG. 2, stack 36*a*, which exemplarily includes small (e.g. 12 oz) sized cups, is positioned towards the front of the beverage dispensing machine and medially, e.g. towards the midline 21 of beverage dispensing machine 10. The stack 36*b*, which exemplarily includes medium (e.g. 16 oz) sized cups, is positioned towards the front of the beverage dispensing machine 10 and laterally, e.g. away from the midline 21 of the beverage dispensing machine 10. The stack 36*c*, which exemplarily includes large (e.g. 21 oz) sized cups, is positioned behind stack 36*b*, and also laterally of the midline 21. The stack 36*d*, which exemplarily includes extra-large (e.g. 32 oz) sized cups, is positioned behind stack 36*a* and also medially towards the midline 21. As seen in FIG. 3, stack 36*b* is further positioned towards the back 14 of the beverage dispensing machine from the stack 36*a* and the stack 36*c* is positioned towards the front 12 from stack 36*d* and towards the back 14 from stack 36*b*. It will be recognized that these positions and examples are merely exemplary and non-limiting as to the order, position, and location of the respective cups and sizes of cups and associated cup dispensing assemblies, within the scope of the present disclosure.

The cup carousel 26 further includes a plurality of cup holders 38 which are configured to receive a cup 36 therein. The cup holders 38 thus define the locations of any cups relative to the cup carousel 26. The cup carousel 26 may further include a conveyor belt 40 to which the cup holders 38 are secured. A shelf 42, for example with a drip tray 44 defined therein underlies the cup holders 38 and the cup carousel 26. The shelf 42 and drip tray 44 serves to catch spilled beverage, ice, or debris so as not to interfere with the operation of the cup carousel 26 and the beverage dispensing machine 10. Operation of a motor, exemplarily a servo motor, rotates the conveyor belt 40, along with the cup holders 38 secured thereto about an exterior of the cup carousel 26. The motor rotates the conveyor belt 40 to position the plurality of cup holders 38 at a plurality of successive indexed locations about the cup carousel 26.

Figure 4:
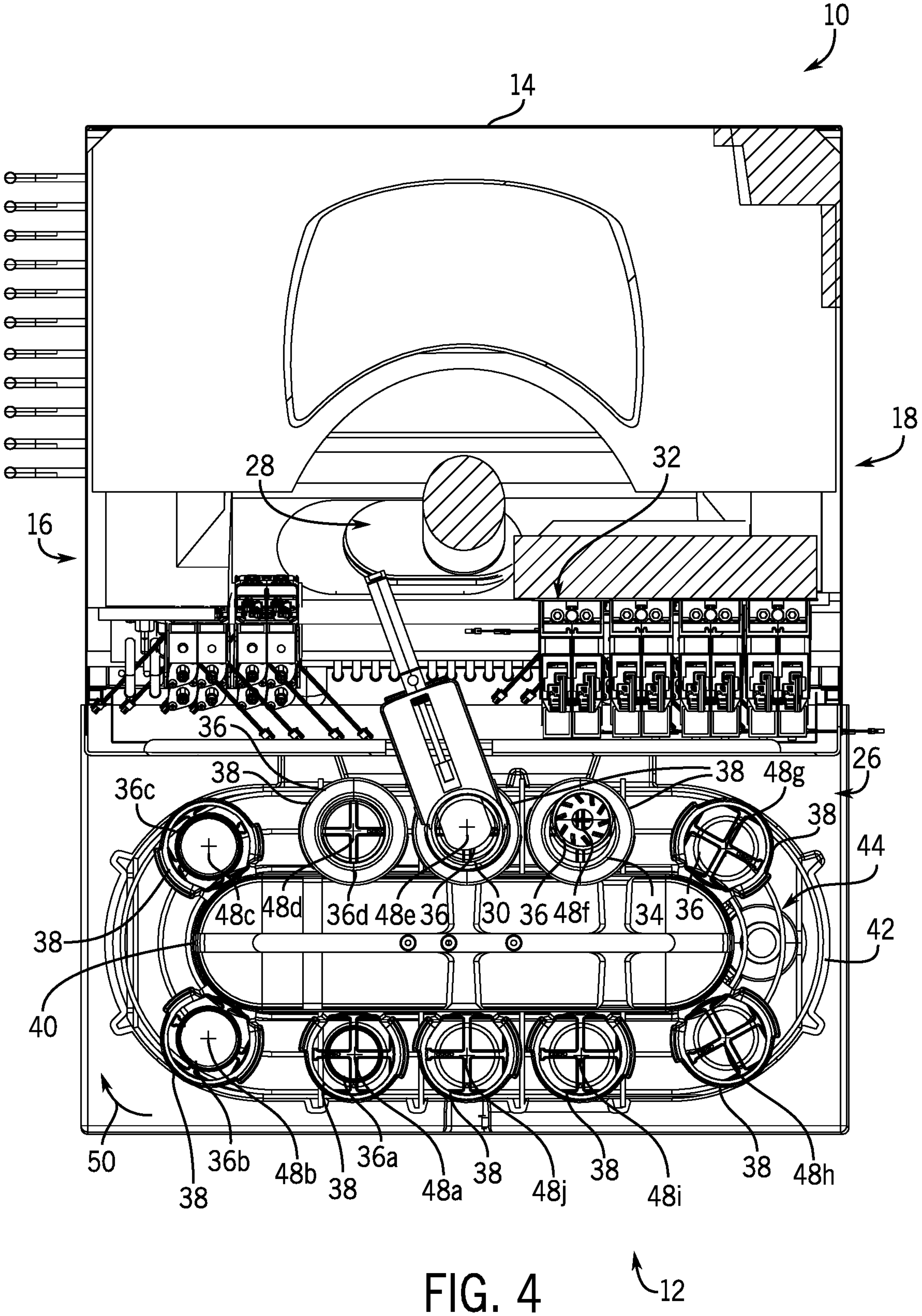
FIG. 4 is a sectional view taken along line 4-4 of FIG. 2.

FIGS. 3 and 4 further depict the cup carousel 26. FIG. 3 is a side view of the beverage dispensing machine 10 and FIG. 4 is a sectional view of the beverage dispensing machine 10 taken along line 4-4 of FIG. 2. The cup carousel 26 exemplarily includes ten cup holders. Each of the cup holders 38 are identified, e.g. cup holder #'s 1-10. As previously noted, the cup carousel 26 operates to move the cup holders 38 through a sequence of indexed locations. The cup holders 38 are positioned at each of the indexed locations 48, and which will be further identified as indexed locations 48*a*-48*j*. The plurality of indexed locations 48*a*-48*j* of the carousel 26 thus defines an endless circuit of indexed locations 48*a*-48*j* through which the cup holders 38 are moved. The cup holders 38 may be secured to the conveyor belt 40 with a dovetail connection, while other types of releasable connections may also be used. The beverage dispensing machine 10 is for example calibrated such that the positions each of the cup holders is known, for example by initially locating cup holders 1-10 respectively at indexed locations 48*a*-48*j*. The conveyor belt 40 may be a silicone or rubber belt or may be formed of a plurality of articulated sections. In examples, flexibility or articulation in the conveyor belt 40 may provide a degree of lateral flexibility which facilitates conformity of the conveyor belt about the gears at either end of the cup carousel 26.

Indexed locations 48*a*-48*d* respectively coincide with the stacks 36*a*-36*d* of cups and therefore represent a plurality of cup loading locations. That is, a cup 36 dispensed from stack 36*a* of cups will drop into cup holder 38 positioned at indexed location 48*a*. A cup 36 dispensed from stack 36*b* of cups will drop into cup holder 38 positioned at indexed location 48*b*. A cup 36 dispensed from stack 36*c* of cups will drop into cup holder 38 positioned at indexed location 48*c*. A cup 36 dispensed from stack 26*d* of cups will drop into cup holder 38 positioned at indexed location 48*d*. Indexed location 48*e* coincides with the ice dispensing chute 30 of the ice dispenser 28. Ice dispensed through the ice dispensing chute 30 will fall into a cup positioned at indexed location 48*e*. Indexed location 48*f* coincides with the nozzle 34 of the beverage dispenser. A beverage dispensed through the nozzle 34 will fall into a cup positioned at indexed location 48*f*. Indexed locations 48*g*-48*j* respectively represent a plurality of staging locations of the plurality of indexed locations. Indexed locations 48*g*-48*i* are the indexed locations at which the cups of the dispensed beverages are held until the cups of the dispensed beverages can be removed for delivery to the customer.

Figure 5:
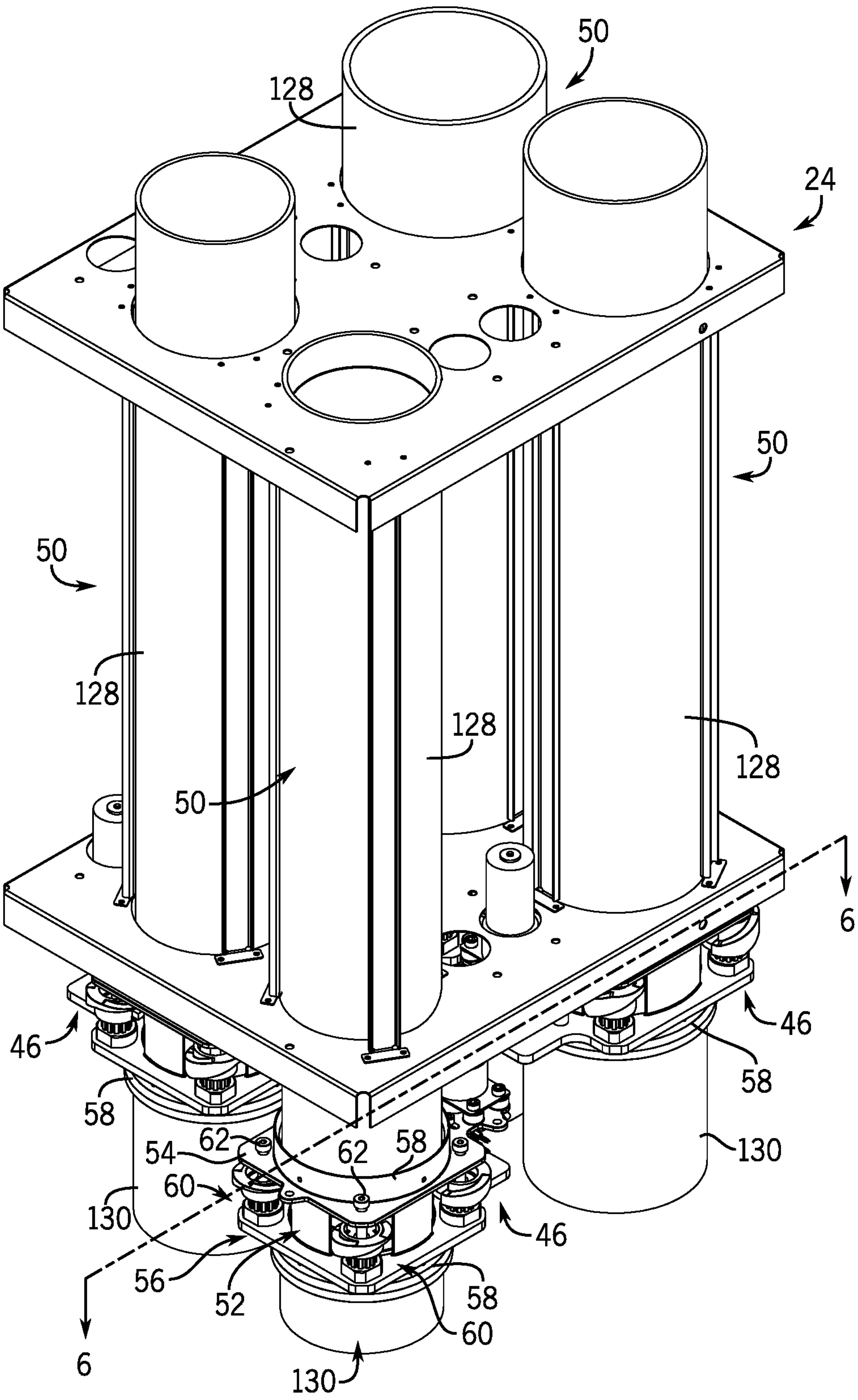
FIG. 5 is a detailed perspective view of the cup dispenser.
Figure 6:
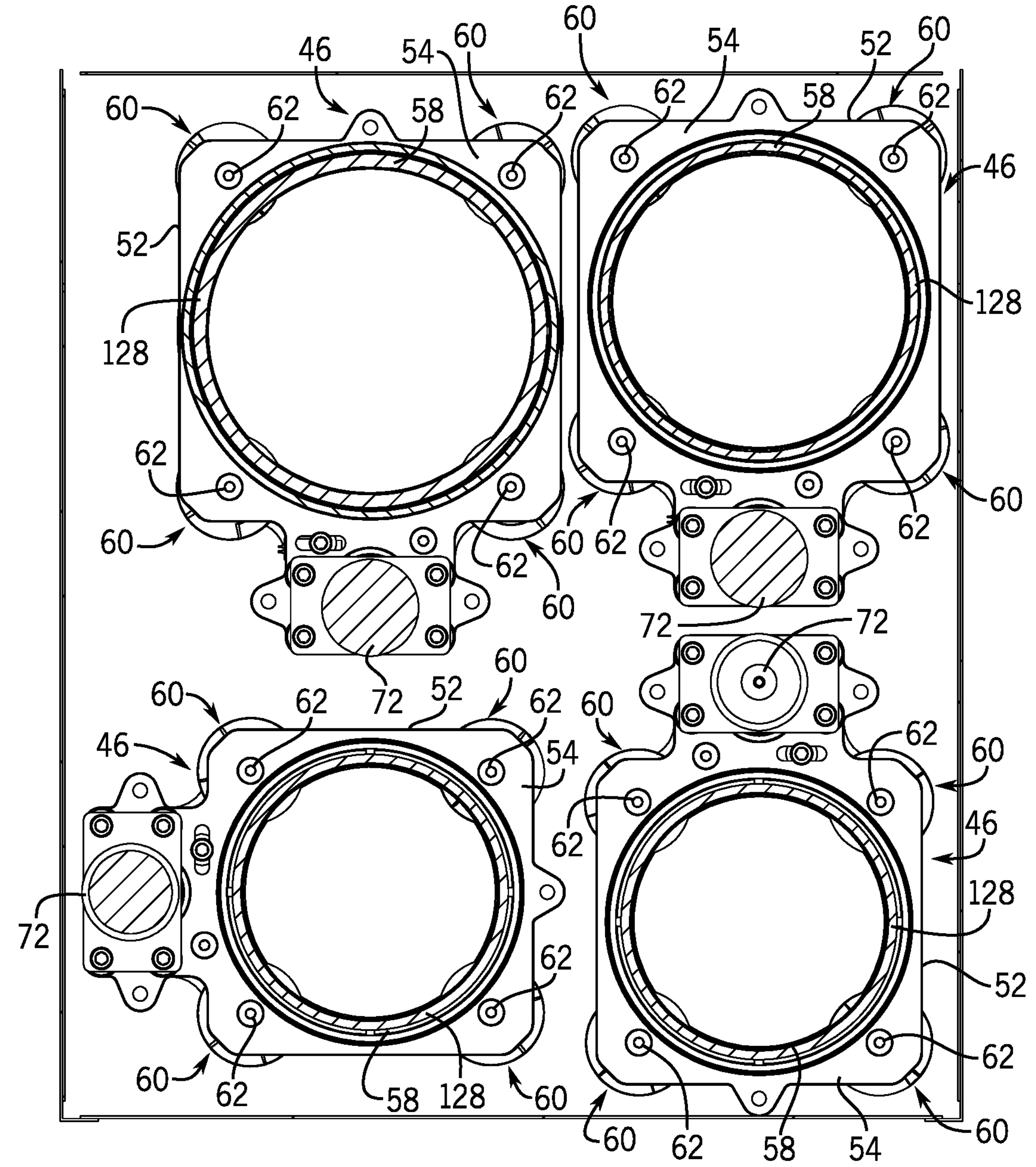
FIG. 6 is a sectional view taken along line 6-6 of FIG. 5.

FIG. 5 is a detailed perspective view of the cup dispenser 24. FIG. 6 is a sectional view taken along line 6-6 of FIG. 5. The cup dispenser 24 includes a plurality of cup dispensing assemblies 50. Each cup dispensing assembly 50 is exemplarily configured for a specific size of cup. It will be recognized that a cup dispensing assembly 50 may be operable to dispense cups within a range of sizes, although in examples provided herein disclose features which may adapt a cup dispensing assembly 50 for optimal dispensing of a particularly sized cup for which the dispensing assembly 50 is designed. Each dispensing assembly 50 includes a selective release device 46 which, as disclosed herein, is adapted to singulate and dispense individual cups as instructed by the system. The selective release device 46 is also configured to receive a stack of cups from which the selective release device 46 subsequently dispenses cups.

The dispensing assembly 50 includes a frame 52 which exemplarily includes an upper frame 54 and a lower frame 56. The upper frame 54 and the lower frame 56 each include an annular flange 58, each of which extend respectively away from the upper frame 52 or the lower frame 54. The annular flanges 58 may respectively define a space for the stack of cups through the selective release device, and may in examples described herein respectively connect to support chimneys 128 and dispense chimneys 130. A plurality of cam assemblies 60 are rotatably positioned between the upper frame 54 and the lower frame 56. The cam assemblies 60 rotate about axles 62 secured between the upper frame 54 and the lower frame 56. The cam assemblies 60 extend partially interior of the annular flange 58. The annular flange 58 is dimensioned to receive a stack of cups with a predetermined outer diameter therethrough while the cam assemblies 60 engage a lip of the cups as described herein.

Figure 7:
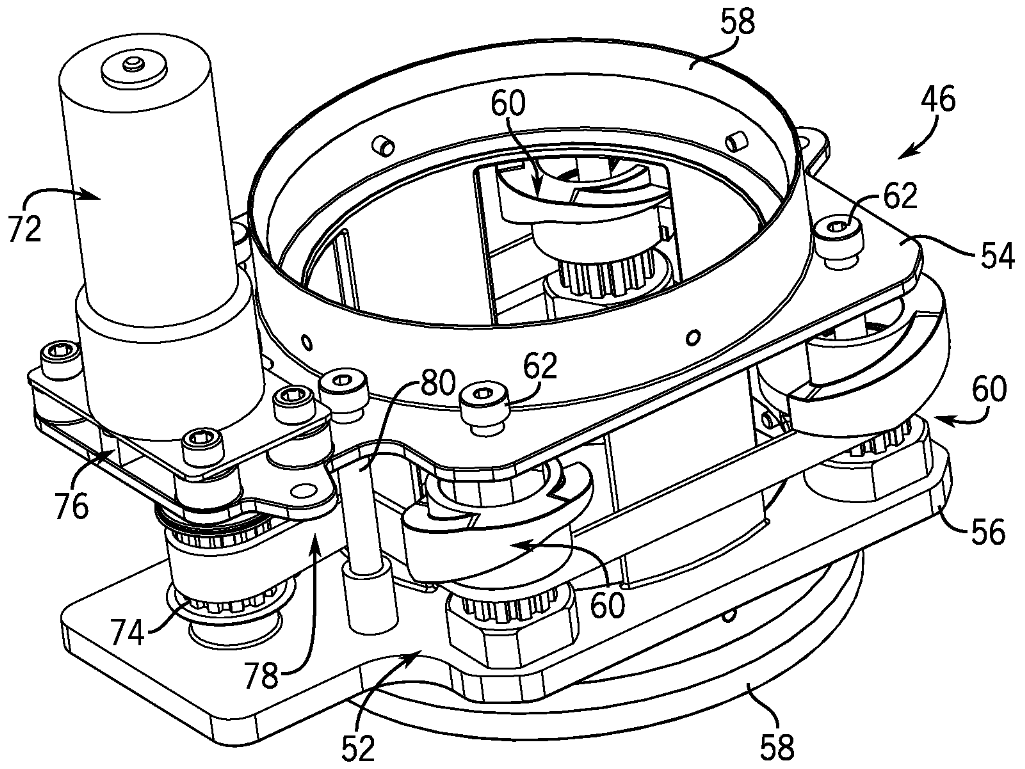
FIG. 7 is a detailed view of an example of a selective release device.

FIG. 7 is a detailed view of an example of a selective release device 46. The cam assembly 60 includes a cam assembly body 64. The cam assembly body 64 includes a cam 66 and a pulley gear 68. The cam assembly 60 further includes a cup support flap 100. An electric motor 72 provides motive power to the selective release device 46. The electric motor 72 is exemplarily controlled by a controller of the beverage dispensing machine 10, and receives and operates according to one or more electrical signals upon which the motor 72 operates to advance the cam assemblies 60 as described herein to carry out a dispense of a selected cup. The electric motor 72 is connected to a drive gear 74. Rotation sensor 76 is positioned relative to the motor 72 to detect for confirmation that the motor 72 has responded to an associated signal to operate to rotate the motor to dispense a cup from the selective release device 46. A belt 78 wraps around the drive gear 74 and the pulley gears 68 of each of the cam assemblies 60 of the selective release device 46. One or more rollers 80 may engage the belt 78 to facilitate a change of direction of the belt 78 towards the cam assemblies 60. The belt 78 operates to distribute the motive power from the electric motor 72 to all of the cam assemblies 60 simultaneously. The belt 78 is exemplarily constructed of a rubber, synthetic rubber, or other elastomeric material and may include internally facing teeth (not depicted) that mesh with teeth of the respective drive gear 74 and the pulley gears 68. The interconnection of the cam assemblies 60 by the belt 78 and the teeth of the belt 78 engaging the pulley gears 68 helps to evenly and simultaneously rotate the cam assemblies 60.

Figure 8:
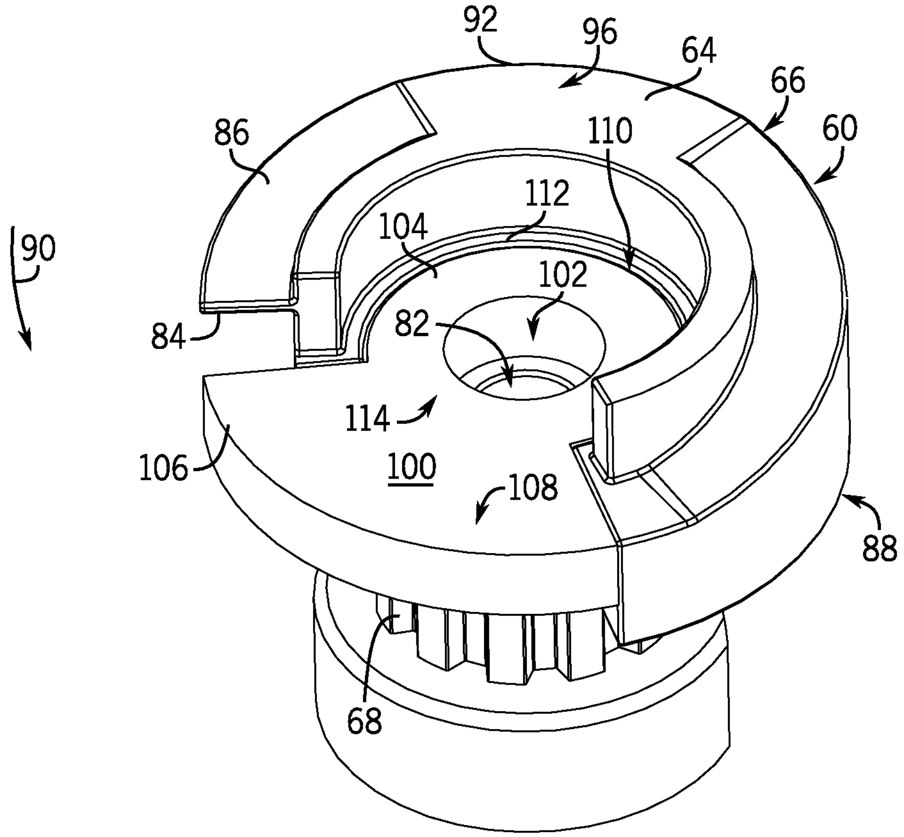
FIG. 8 is a detailed perspective view of a cam assembly.
Figure 9:
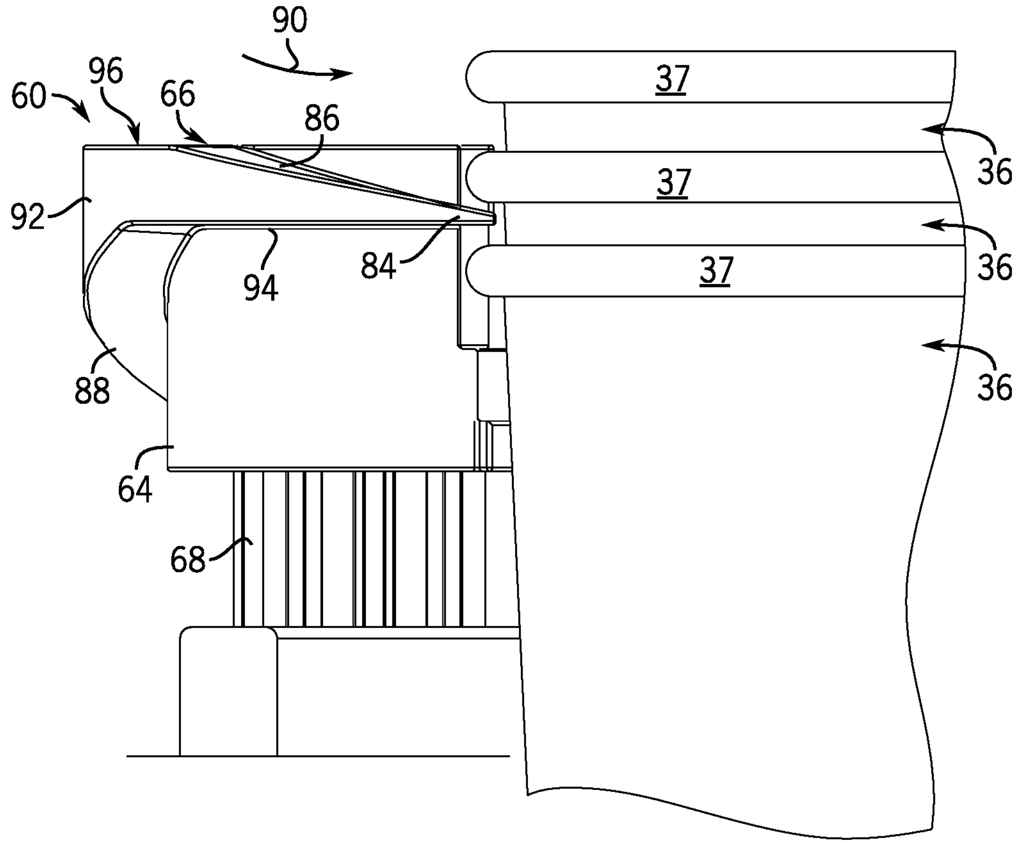
FIG. 9 depicts a cam assembly relative to cups to be dispensed.

A cam assembly 60 is shown in a detailed perspective view in FIG. 8. FIG. 9 depicts the cam assembly 60 relative to cups 36 to be dispensed. The cam assembly 60 includes a cam assembly body 64, a cam 66 and a pulley gear 68. A through hole 82 is configured to accommodate the axle 62. As will be described in further detail herein, the cam 66 rotates with the cam assembly 60 by the belt 78 moving about the pulley gear 68. The cam 66 includes a cam ridge 92 extending outwardly from the cam body 64. The cam 66 forms a leading cam edge 84 and a leading cam surface 86. The cam 66 further includes a trailing cam surface 88. The cam assembly 60 is configured to rotate in the direction of arrow 90, in which as will be described in further detail herein. As the cam assembly 60 rotates, the leading cam edge 84 engages a cup to be dispensed above the lip 37 of the cup to be dispensed, between respective lips 37 of the first two cups in a stack of cups within the dispensing assembly 50. As the cam assembly 60 continues to rotate, the leading cam surface 86 engages the lip 37 of the second cup 36 while a lower cam surface 94 of the cam 66 opposite the leading cam surface 86 engages the lip 37 of the first cup 36 which is the cup to be dispensed. The lower cam surface 94 is exemplarily horizontal, while the leading cam surface 86 angles upwards away from the lower cam surface 94. As the cam assembly 60 rotates, the distance between the lower cam surface 94 and the leading cam surface 86 at the point of engagement with the lips 37 of the cups 36 increases. Engagement of the cam 66 between the lips 37 of the cups 36 forces the cups apart, providing a singulation of the cup to be dispensed from the second cup and the rest of the cups in the stack of cups.

As the cam assembly 60 further rotates, the lip 37 of the second cup is supported by an upper cam surface 96, while the lip 37 of the cup to be dispensed is engaged by the trailing cam surface 88. The trailing cam surface 88 angles downwardly from the lower cam surface 94. This descending angle of the trailing cam surface 88 further separates the cup 36 to be dispensed from the rest of the cups of the stack, such that completion of a revolution of the cam assembly 60 about the axle separates the cup 36 from the stack of cups, and the cup 36 is able to fall therefrom by the force of gravity as will be described in further detail herein. It will be recognized that the dispensing assemblies 50 as shown and described include one or more of the cam assemblies 60 as shown and described. In the example shown in the Figures, the dispensing assemblies 50 each include four cam assemblies 60 which synchronously operate in the manner described above due to the common operative engagement with the belt 78 driven by the motor 72.

Figure 10:
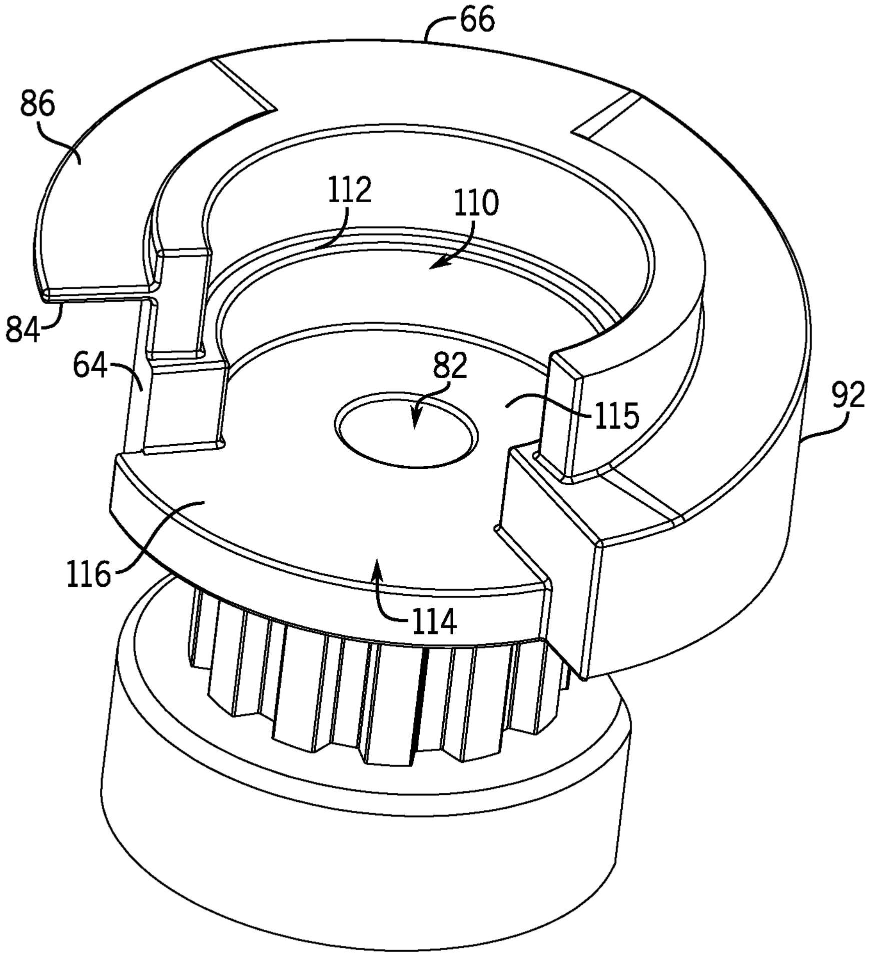
FIG. 10 is a detailed view of a cam assembly without the support flap.

Looking to FIGS. 8 and 10, the cam assembly 60 further includes a cup support flap 100. The cup support flap 100 is exemplarily formed of an elastomeric material, or other material that is resiliently flexible. The cup support flap 100 includes a body 104 from which a flap projection 106 extends. A through hole 102 through the body 104 of the cup support flap 100 forms an annulus. The through hole 102 is in alignment with the hole 82 of the cam assembly body 64, both of which are configured to receive the axle 62 therethrough. The flap projection 106 extends radially away from the annulus of the body 104 and exemplarily exhibits a shape of an arc, the arc of the flap projection 106 exemplarily matches the radius and arc of the cam 66 of the cam assembly 60. At the start of a dispensing operation, the lip 37 of the cup 36 to be dispensed rests on the flap projection 106 of the cup support flap 100. The flap projection 106 engages the lip 37 of the cup 36 to be dispensed and positions the lip 37 relative to the leading edge 84 of the cam 66. The positions the cup 36 to be dispensed in a proper relationship with the cam 66. An upper surface 108 of the flap projection 106 of the cup support flap 100 may be vertically spaced from the leading edge 84 and the lower cam surface 94 by a distance which is adapted to accept the lip 37 of the cup 36 to be dispensed.

FIG. 10 is a detailed view of the cam assembly 60 without the cup support flap 100. As can be seen in comparison between FIGS. 8 and 10, the cam assembly body 64 defines a pocket 110 and the cup support flap 100 is received within the pocket 110. The pocket 110 is exemplarily circular and is concentric to the cam body 64. The pocket 110 may be defined by a shoulder 112 that extends radially interior from the cam body 64. A pocket floor 115 extends between cam body 64, and exemplarily from the shoulder 112, to the hole 82. The annular body 104 of the cup support flap fits interior of the shoulder 112 within the pocket 110 and rests on the pocket floor 115. The cam body 64 includes a radial cut out 114 through which the flap projection 106 of the cup support flap 100 extends. The flap projection 106 is supported by a shelf 116 which extends radially outward from the pocket 110, and may be co-planar with the pocket floor 115. However, it is noted that as described herein, examples of the shelf 116 radially terminate at a distance interior of the radially external extent of the cam 66 and the flap projection 106.

Figure 11A:
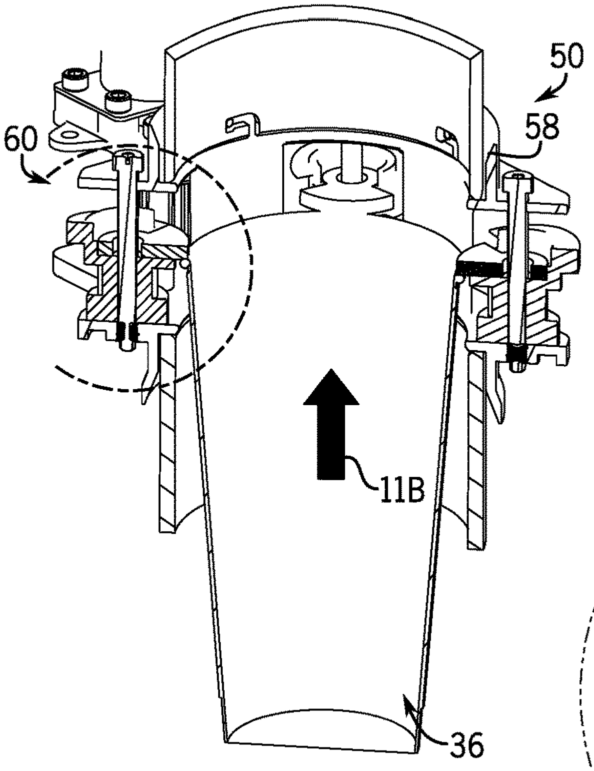
FIG. 11 depicts a process of loading cups into the dispensing assembly.

FIGS. 11A-D depict a process of loading cups into the dispensing assembly 50 as is described in further detail herein. FIG. 11A provides a sectional view of a cup 36 being loaded into a dispensing assembly 50, while FIGS. 11B-D3 are detailed insets of the portion of FIG. 11A denoted with line A-A, and focused about the cam assembly 60 that depict various operational stages while the cup 36 is loaded into the dispensing assembly 50. While a single cup 36 is depicted in FIGS. 11A-D, it will be recognized that this process is reflective of an example of a dispensing assembly 50 in which the stacks of cups 36 are held in the upright or dispense orientation and the dispensing assembly 50 is loadable from the bottom, for example in the direction of arrow 118 in FIG. 11A.

Figure 11B:
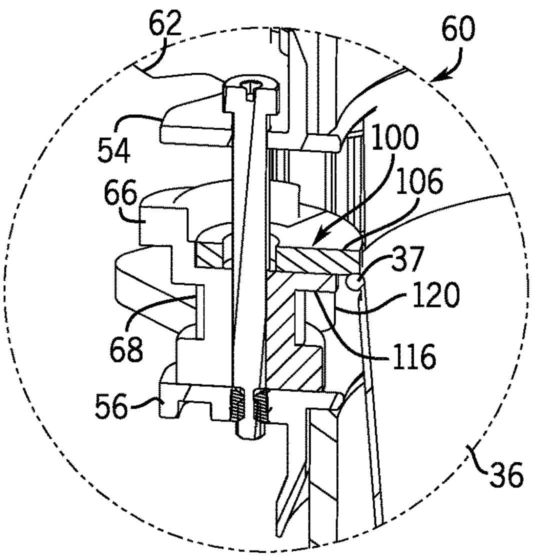
Figure 11C:
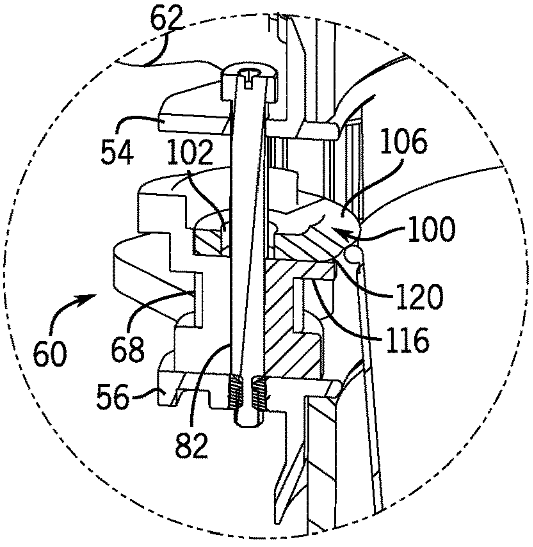
Figure 11D:
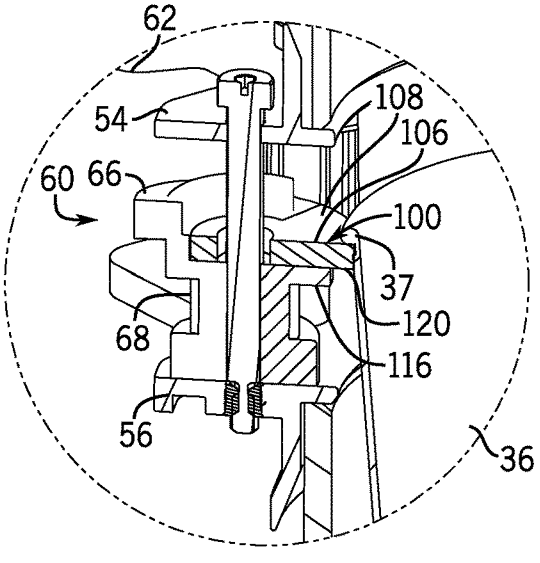

In FIG. 11B, the cup 36 has been moved in the direction of arrow 118 until the lip 37 of the cup 36 hits an underside 120 of the flap projection 106. It will be recognized that at this point of engagement between the lip 37 and the underside 120 of the flap projection 106, that the lip 37 is in a same general plane as the shelf 116. That is, the shelf 116 is radially exterior from the lip 37. As the cup 36 is further moved in the direction of the arrow 118, engagement of the lip 37 with the underside 120 of the flap projection 106, places a force upon the flap projection 106. The flap projection 106, being constructed of an elastomeric or otherwise resiliently deformable material, deforms under this force, as shown in FIG. 11C. The deformation of the flap projection 106 exhibits in the flap projection deforming upwards in the direction of arrow 118. In an example, the pocket 110 may be constructed and/or dimensioned with a tolerance which enables the flap projection 106 or the cup support flap 100 to move in the direction of arrow 118. The flap projection 106 places a resistive force against the lip 37 of the cup 36, however under further force in the direction of arrow 118. The flap projection 106 is overcome and the lip 37 moves above the flap projection 106, the lip 37 of the cup 36 now rests on the upper surface 108 of the flap projection 106 and the cup 36 is retained within the dispensing assembly 50 as the next cup to be dispensed therefrom as depicted in FIG. 11D. It will be recognized that to load the dispensing assembly 50 with more cups 36 the same process is repeated. It is further recognized that a plurality of cups forming a cup stack may all be moved in the direction of arrow 118 at the same time to load the dispensing assembly with an entire stack of cups in a single operative effort.

Figure 12:
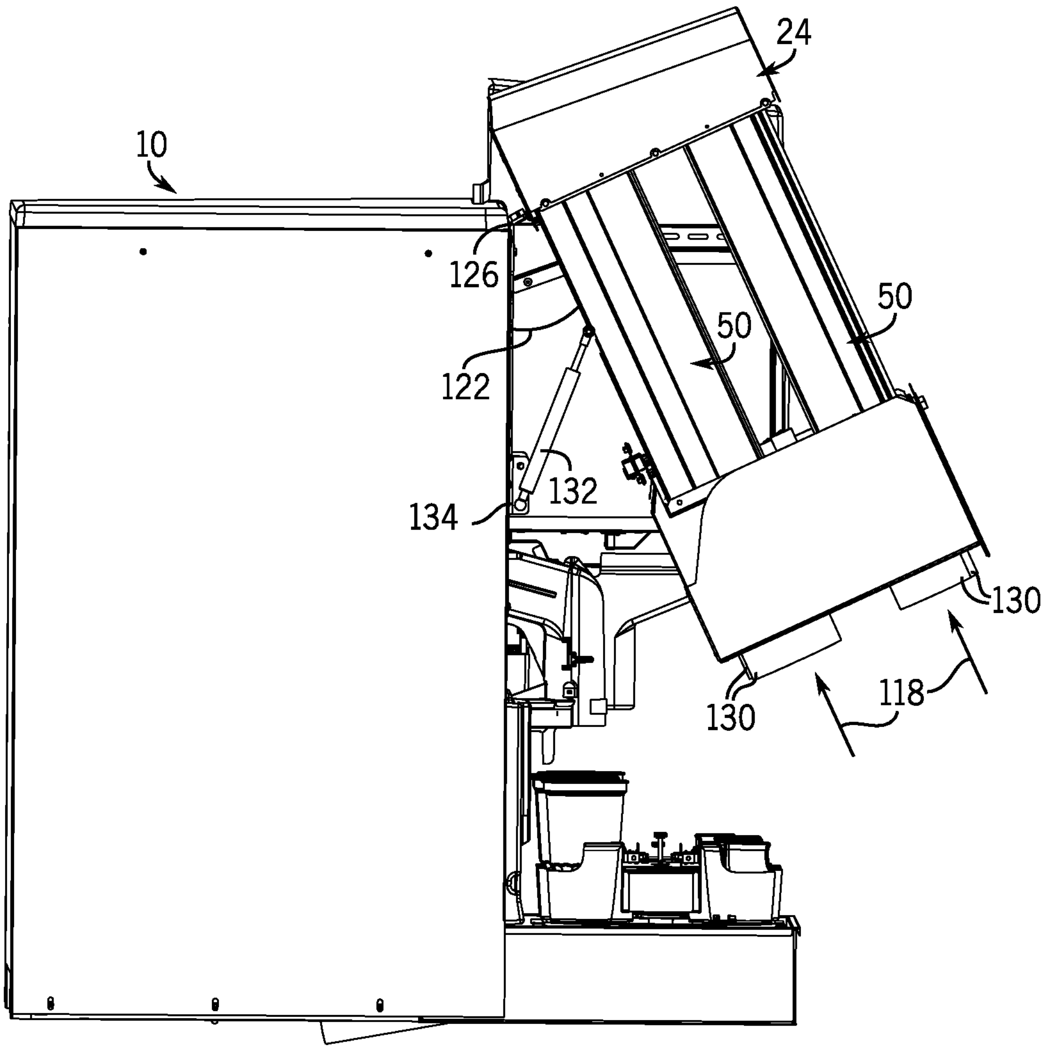
FIG. 12 depicts an example of a hinge system for the cup dispenser.

Reference is made back to FIG. 3 as well as to FIG. 12 in the context of the disclosure above with respect to FIG. 11. To load the dispensing assemblies 50 of the cup dispenser 24 from the bottom as described with respect to FIG. 11, the cup dispenser 24 is pivotable to a loading position shown in phantom lines and reference 124 in FIG. 3 and as the cup dispenser 24 is shown in FIG. 12. In an example, the cup dispenser 24 is rotated about an angle 122 which may be between 10 degrees and 30 degrees, but in other examples, may be between 20 degrees and 25 degrees. A still further example may be 22 degrees, while other examples are outside of the 10-30 degree range. To achieve the movement of the cup dispenser 24 about this angle, the cup dispenser 24 may be connected to the beverage dispensing machine 10 by a hinge 126. Furthermore, a gas spring 132 is secured between a frame 134 of the beverage dispensing machine 10 and the cup dispenser 24. The gas spring 132 is biased to support at least a portion of the weight of the cup dispenser 24 when it is rotated about the hinge 126 to the cup loading position as exemplarily shown in FIG. 12. This maintains the cup dispenser 24 in the cup loading position, for example so that a worker can use two hands to insert the stacks of cups into the dispensing assemblies 50. Other types of biasing devices may be used to support the cup dispenser 24 in the cup loading position. It will be recognized that when the cup dispenser 24 is moved back to the dispensing or operational position, the biasing force of the gas spring 132 or other device is overcome, and that the cup dispenser 24 may be latched or otherwise physically secured in the operational position.

Referring back to FIG. 5, the dispensing assemblies 50 of the cup dispenser 24 include further features to facilitate the dispense of cups within the beverage dispensing machine 10. As described with respect to FIG. 11, a stack of cups 36 may be loaded into a dispensing assembly 50 from the bottom past the selective release device 46. Because the stack of cups extends above the selective release device, it has been discovered that inclusion of a support chimney 128 that is secured to the annular flange 58 and extends upwards therefrom helps to maintain the stack of cups in alignment with the selective release device 46. The support chimney 128 maintains the stack of cups in a vertical orientation. Additionally, it has been found that the operation of the selective release device 46 imparts an oscillating motion on the stack of cups. This oscillating motion may move cups of the stack of cups out of axial alignment with one another. If the stack of cups is out of axial alignment, the operation and function of the selective release device may be impaired. The support chimney 128 counteracts this motion, keeping the stack of cups upright within the support chimney 128, this may maintain the weight of the stack of cups in axially alignment with the selective release device 46, improving the singulation and dispense of an individual cup upon operation of the beverage dispensing machine 10.

The dispensing assemblies 50 may also include dispense chimneys 130. The dispense chimneys 130 are connected to the annular flange 58 secured to the lower frame 56. As previously noted, the beverage dispensing machine 10 is configured to dispense beverages into a plurality of sizes of cups all dispensed from the cup dispenser 24. Improvements to the consistency of the dispense of multiple cup sizes into the same cup holders 38 may be achieved with modifications to the cup dispensing assemblies 50 dependent upon the size of cup for which the cup dispensing assembly 50 is configured. As described above, the selective release device 46 engages the lip of a cup to be dispensed. The selective release device 46 may therefore be positioned at a vertical distance above the cup carousel 26 and the cup holders 38 such that the bottoms of each of the cups to be dispensed are the same height from the bottoms of the respective cup holders 38 into which the cups will be dispensed. This has been found to provide a consistent interaction between the cup and the cup holder 38 into which it is dispensed, independent of the actual size of the cups dispensed. Therefore, as shown in FIG. 5, the vertical position of the selective release device 46 may be defined dependent upon the size of cup to be dispensed from an individual cup dispensing assembly 50. Additionally, with one or more of the selective release devices 46 positioned at different vertical positions, in some examples this may enable closer spacing of the selective release devices 46 as demonstrated by center point to center point distances between the selective release devices 46. This may result in a reduction in the footprint area of the cup dispenser 24.

The dispense chimney 130 is connected to the lower frame 56 at the annular flange 58. Once a cup is singulated and dispensed from the selective release device 46, the cup falls through the dispense chimney 130. Given the differences in the height position of the selective release devices 46 as described above, the dispense chimneys 130 may exemplarily extend from each of the selective release devices to the nominal positions of the bottom of the cups, which may be even across all cup dispensing assemblies 50 due to the positioning of the selective release devices 46. However, in other examples, the dispense chimneys 130 may extend for another distance as well from the selective release devices.

The dispense chimneys 130 provide two functions which may improve functioning of the cup dispenser. First, the dispense chimneys 130 help to axially align the dispensed cup with the cup holder 38 at the associated indexed location 48 as the cup falls from the selective release device 46 to the cup holder 38. As noted above, the selective release device 46 may impart an oscillating motion on the cups, which may extend to the dispensed cup. The dispense chimney 130 thus keeps the cup falling in a straight path. Additionally, as the cup falls within the dispense chimney 130, the dispense chimney 130 slows the flow of air around the falling cup, which in turn slows the cup as it falls into the cup holder. By slowing the cup as it falls into the cup holder, the force of the impact of the cup against the bottom of the cup holder is reduced causing a softer landing of the cup within the cup holder. This softer landing reduces instances of the cup bouncing out of the cup holder or otherwise moving to an unintended or misaligned position within the cup holder. In a still further example, the cup holder 38 may be fitted with a rubber, elastomeric, or other cushioned or deformable material in the bottom, which may further absorb the force of the cup falling into the cup holder, improving retention of the cup within the cup holder.

Figure 13:
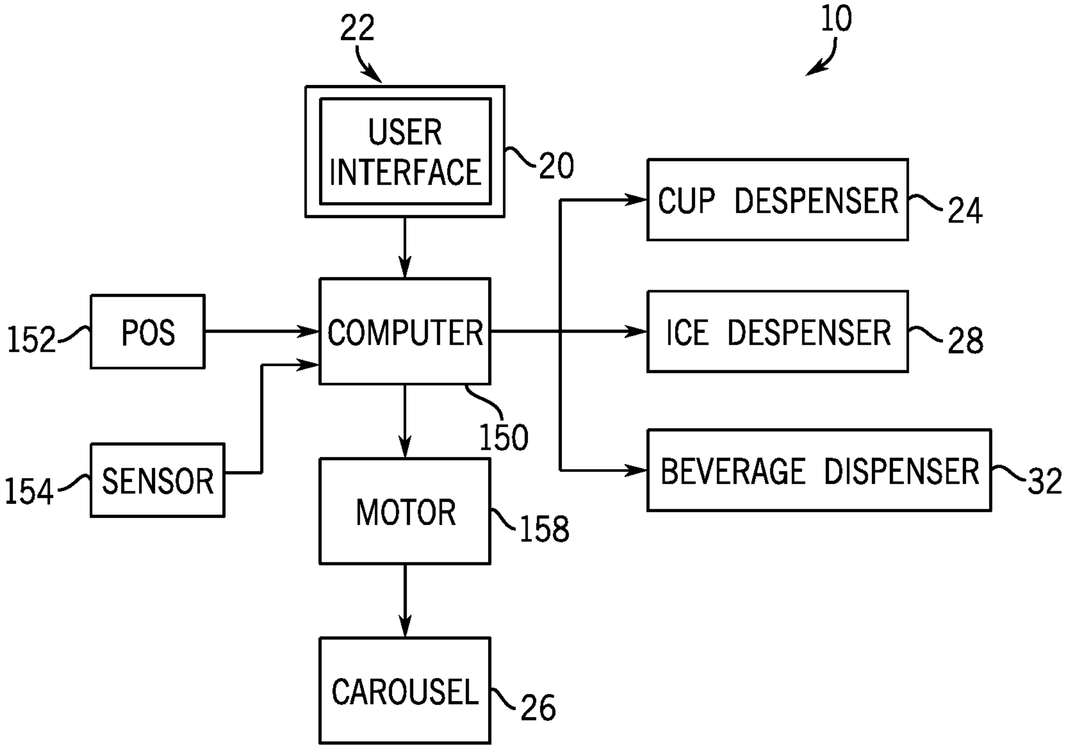
FIG. 13 is a system diagram of an example of a beverage dispensing machine.

FIG. 13 is a system diagram of a beverage dispensing machine 10 as has been described herein. The beverage dispensing machine 10 includes a computer 150 which receives inputs from components depicted in FIG. 13 and as previously described above. In response to the inputs, the computer 150 produces outputs and control signals to the components depicted therein such as to carry out the functions of the beverage dispensing machine 10 as described herein. The computer 150 is exemplarily a single board computer (SBC) which includes a microprocessor and associated computing components for e.g. power management, communication, and/or memory. The computer 150 executes computer readable code stored in a non-transient computer readable medium, causing the computer 150 to carry out the functions as described herein.

The computer 150 is configured to receive user inputs, including, but not limited to various orders of beverages to be dispensed. The order exemplarily includes both a beverage size (e.g. volume) and a type (e.g. premixed beverage or selection of flavoring and diluent). The beverage dispensing machine 10 may operate to receive an order input through a user interface 22 presented on a graphical display 20. The computer 150 may be communicatively connected to the graphical display 20 to provide the graphical display 20 with instructions to operate to visually present the user interface 22 thereon. The graphical display 20 may further be a touch-sensitive graphical display operable to receive one or more user inputs of the beverage order and communicate those user inputs to the computer 150. In a still further example, the computer 150 is communicatively connected to a point of sale (POS) system 152 into which customer orders are received and processed for fulfillment. A restaurant may include communication kiosks operable by either a customer or by a restaurant employee to enter the customer order into the POS system. In still further examples, the POS system may operate to receive customer orders placed through an online order system. While examples of such communication is provided in the present disclosure, including, but not limited to that provided in U.S. Pat. No. 10,689,240 and U.S. Patent Application Publication No. 2020/0273283, it will be recognized that other manners of communication of customer beverage orders into the beverage dispensing machine may be used. Once such orders are received by the POS system 152, the orders are communicated to the computer 150 and the beverage dispensing machine 10 may operate as disclosed to automatedly fulfill the received customer orders.

As previously described, the beverage dispensing machine 10 operates to provide a series of indexed locations 48*a-j* and operates to advance the cup holders through this plurality of indexed locations to automate the beverage dispensing process. The computer 150 receives a signal from a sensor 154 indicating that the cup holder at the last staging location (e.g. 48*j*) of the plurality of indexed locations is clear of a cup. The beverage dispensing machine 10 is then ready to dispense a cup for a subsequent beverage order into this cup holder. The computer 150 provides an instruction to the motor 158 to advance the carousel 26 one increment to move each of the cup holders 38 from the indexed location in which the cup holder is currently located to a next subsequent indexed location of the plurality of indexed locations 48*a-j*. The computer 150 maintains a record, at a memory at a computer readable medium, which exemplarily includes the location of each identified cup holder, the current indexed location of each cup holder, and a status of each cup holder. The status of each cup holder may include if a cup is located therein, a cup size located therein, an ordered beverage to be dispensed or an identification of the dispensed beverage in the cup.

As previously described, the cup dispenser 24 may operate to dispense each of a plurality of differently sized cups at each of a plurality of cup dispensing locations. Continuing the example, if the customer order specifies a "small" cup size, exemplarily associated with indexed location 48*a*, then the cup dispenser 24 is operated by a control signal from the computer 150 to dispense a single small cup into the cup holder (eg. cup holder #1) located at the first indexed location 48*a*. The computer 150 updates the associated record accordingly to note that an empty small cup is now in cup holder #1 which is at indexed location 48*a*. If the customer order instead specifies another size of cup, then the cup dispenser 24 is operated to not release a cup until the cup holder #1 reaches the indexed location (e.g. 48*a-d*) associated with the selective release device for the specified cup size. The computer 150 updates the records for each of the cup holders/cup locations with each operation to advance the plurality of cup holders/cup locations to the subsequent indexed locations.

The motor 158 is operated to advance the plurality of cup holders/cup locations through the subsequent indexed locations. When cup holder #1, containing a cup therein, is advanced to the ice dispense location (e.g. indexed location 48*e*), the computer 150, noting that the customer order associated with cup holder/cup location #1 is a "small" size (e.g. volume) beverage that requires ice, provides instructional communications to the ice dispenser 28 to dispense a "small" size quantity of ice. The computer 150 updates the record for cup holder #1 to reflect a small cup filled with ice at indexed location 48*e*.

The motor 158 is next operated by the computer 150 to advance the plurality of cup holders/cup locations to the subsequent indexed location (e.g. cup holder #1 at indexed location 48*e* is moved to indexed location 48*f*) which is the beverage dispense location, associated with the beverage dispenser 32. The computer 150, noting that the customer order associated with cup holder #1 is a "small" size cola beverage, provides instructional communications to the beverage dispenser 32 to operate the associated valves to dispense a cola beverage in the volume associated with a "small" size. The computer 150 updates the record for cup holder/cup location #1 to reflect a small cup filled with ice and cola at indexed location 48*f*.

The motor 158 is next operated by the computer 150 to advance the plurality of cup holders/cup locations to the subsequent indexed location (e.g. cup holder/cup location #1 to indexed location 48*g*) which is the first staging location. While at any one of the plurality of staging locations, the dispensed beverage may be removed for delivery to the customer. However, the plurality of staging locations, provide the ability to aggregate dispensed beverages into a single customer order and removal from the beverage dispensing machine at one time (e.g. in quick succession of each other). As the beverage dispensing machine 10 operates to automatedly dispense further customer-ordered beverages, the motor 158 is operated by the computer 150 to advance the plurality of cup holders/cup locations to the subsequent indexed location (e.g. cup holder #1 to indexed location 48*h*, then 48*i*, then 48*j*). As noted above, if the cup at cup holder #1 is not removed by the time that cup holder #1 reaches indexed location 48*j*, then the sensor 154 will provide a signal to the computer 150 to hold on any further operations to the motor 158, advancing the cup holders/cup locations to any subsequent indexed locations until cup holder #1 is clear and ready to receive a new cup for a subsequent customer order.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification. It is recognized that the examples provided herein as well as in the references incorporated by reference are examples of the disclosure and that still further combinations of the features of these individual disclosures are recognized to be made and are considered to be within the scope of the present disclosure.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An automated beverage dispensing system having a front and a back and a first side opposite a second side, the automated beverage dispensing system further comprising:

a conveyance system that defines a plurality of cup locations each with a respective cup holder and operates to sequentially move the plurality of cup locations through a circuit comprising a plurality of indexed locations; and a cup dispensing system configured to receive a first supply of cups at a first dispensing assembly, the first dispensing assembly comprising a first selective release device, the first dispensing assembly coincides with a first indexed location of the plurality of indexed locations and the cup dispensing system is configured to receive a second supply of cups at a second dispensing assembly comprising a second selective release device, the second dispensing assembly coincides with a second indexed location of the plurality of indexed locations, the cup dispensing system operable to dispense a cup from the first supply of cups to a first cup location of the plurality of cup locations on the conveyance system at the first indexed location and operable to dispense a cup from the second supply of cups to a second cup location of the plurality of cup locations on the conveyance system at the second indexed location;

wherein the first selective release device comprises a cam assembly comprising a cam body, a cam extending about the cam body and radially away from the cam body, the cam comprising a cam edge, a leading cam surface, and a trailing cam surface, the cam assembly comprising a resiliently deformable cup support flap radially extending from the cam body.

2. The automated beverage dispensing system of claim 1, wherein the first dispensing assembly comprises a first plurality of selective release devices including the first selective release device, and the second dispensing assembly comprises a second plurality of selective release devices including the second selective release device.

3. The automated beverage dispensing system of claim 2, wherein the cam assembly of each of the selective release devices comprises a gear about the cam body;

wherein the cup support flap extends radially away from an axis of the cam body.

4. The automated beverage dispensing system of claim 3, wherein each dispensing assembly comprises a motor and a drive gear, and further comprising a belt operatively extending between the drive gear and the gear about the cam body of each of the selective release devices of a respective dispensing assembly, wherein movement of the belt by the drive gear simultaneously moves each of the cam assemblies by interaction with the respective gears of the cam assemblies.

5. The automated beverage dispensing system of claim 3, wherein the cup support flap of each of the dispensing assemblies is constructed of an elastomeric material and is configured to deform to receive a supply of cups pushed therethrough to load first dispensing assembly with the first supply of cups or the second dispensing assembly with the second supply of cups.

6. The automated beverage dispensing system of claim 5, wherein the cup dispensing system is configured to upwardly tilt relative to a rest of the automated beverage dispensing system to a loading configuration wherein the dispensing assemblies are accessible to receive the supply of cups through the dispensing assemblies past the selective release devices.

7. The automated beverage dispensing system of claim 3, further comprising a support chimney extending from each of the dispense assemblies, wherein the support chimneys are configured to receive a stack of cups there of the first supply of cups or the second supply of cups.

8. The automated beverage dispensing system of claim 7, wherein each dispensing assembly is positioned at a different height above the first and second indexed locations, and each dispensing assembly further comprises a dispensing chimney extending from the dispensing assembly in a direction of the first and second indexed locations, respectively, wherein the dispensing chimney of each of the dispensing assemblies end at a same height above the respective first and second indexed locations.

9. The automated beverage dispensing system of claim 1, further comprising:

a beverage dispensing system configured to dispense a beverage at a beverage dispense location of the plurality of indexed locations; and a computer that associates an ordered beverage to a cup location of the plurality of cup locations and maintains a record of a status of the cup location and a position of the cup location relative to the plurality of indexed locations.

10. A selective release device for dispensing a cup, the selective release device comprising a cam assembly, the cam assembly comprising:

a cam body;

a cam extending about the cam body and radially away from the cam body, the cam comprising a cam edge and a leading cam surface and a trailing cam surface; and a resiliently deformable cup support flap radially extending from the cam body.

11. The selective release device of claim 10, further comprising:

a gear about the cam body;

a drive gear; and a belt that engages the drive gear and the gear about the cam body, wherein the drive gear moves the belt which in turn moves the cam body.

12. The selective release device of claim 10, wherein the leading cam surface is located on a first side of the cam body in an axial direction and the trailing cam surface is located on a second side of the cam body in an axial direction, the second side opposite the first side.

13. The selective release device of claim 12 further comprising a lower cam surface opposite the leading cam surface, wherein the leading cam surface angles upwards in the axial direction above the lower cam surface from the cam edge.

14. The selective release device of claim 13, wherein the trailing cam surface angles downwards in the axial direction from the lower cam surface.

15. The selective release device of claim 14, wherein the lower cam surface is horizontal.

16. The selective release device of claim 10, wherein the cam body defines a pocket, and the cup support flap is seated within the pocket.

17. The selective release device of claim 16, wherein the cup support flap and the cam body comprise axially aligned through holes.

18. The selective release device of claim 10, further comprising a lower cam surface opposite the leading cam surface in an axial direction, wherein the leading cam surface angles upwards in the axial direction above the lower cam surface from the cam edge, and the cup support flap comprises a flap projection that extends radially outward from the cam body, the flap projection comprising an upper surface positioned below the lower cam surface in the axial direction.

19. The selective release device of claim 18, wherein the flap projection comprises an outer edge in a shape of an arc.

20. The selective release device of claim 10, wherein an outer edge of the cup support flap is complementary with an outer edge of the cam to form an outer circumference of the cam assembly.

* * * * *